(12) United States Patent
Liang et al.

(10) Patent No.: US 12,447,154 B2
(45) Date of Patent: Oct. 21, 2025

(54) USE OF PYRROLOPYRIMIDINE COMPOUND FOR TREATING HEMOPHAGOCYTIC SYNDROME

(71) Applicants: CHIA TAI TIANQING PHARMACEUTICAL GROUP CO., LTD., Lianyungang (CN); LIANYUNGANG RUNZHONG PHARMACEUTICAL CO., LTD., Lianyungang (CN); SHOUYAO HOLDINGS (BEIJING) CO., LTD., Beijing (CN)

(72) Inventors: Hongming Liang, Lianyungang (CN); Xiquan Zhang, Lianyungang (CN); Xunqiang Wang, Lianyungang (CN); Ding Yu, Lianyungang (CN); Dong Wang, Lianyungang (CN); Qi Ge, Lianyungang (CN); Zhao Wang, Beijing (CN); Yini Wang, Beijing (CN)

(73) Assignees: Chia Tai Tianqing Pharmaceutical Group Co., LTD., Lianyungang (CN); Lianyungang Runzhong Pharmaceutical Co., LTD., Lianyungang (CN); Shouyao Holdings (Beijing) Co., LTD., Beijing (CN)

( * ) Notice: Subject to any disclaimer, the term of this patent is extended or adjusted under 35 U.S.C. 154(b) by 651 days.

(21) Appl. No.: 17/910,331

(22) PCT Filed: Mar. 9, 2021

(86) PCT No.: PCT/CN2021/079820
§ 371 (c)(1),
(2) Date: Sep. 8, 2022

(87) PCT Pub. No.: WO2021/180093
PCT Pub. Date: Sep. 16, 2021

(65) Prior Publication Data
US 2023/0133735 A1 May 4, 2023

(30) Foreign Application Priority Data
Mar. 9, 2020 (CN) .................. 202010157375.4

(51) Int. Cl.
*A61K 31/519* (2006.01)
*A61K 9/20* (2006.01)
*A61P 7/00* (2006.01)
*A61P 37/06* (2006.01)

(52) U.S. Cl.
CPC .......... *A61K 31/519* (2013.01); *A61K 9/2013* (2013.01); *A61K 9/2018* (2013.01); *A61K 9/2054* (2013.01); *A61P 7/00* (2018.01); *A61P 37/06* (2018.01)

(58) Field of Classification Search
CPC .. A61K 31/519; A61K 9/2013; A61K 9/2018; A61K 9/2054; A61P 7/00; A61P 37/06
See application file for complete search history.

(56) References Cited

U.S. PATENT DOCUMENTS

| 2019/0023712 A1 | 1/2019 | Zhang et al. |
| 2019/0183899 A1 | 6/2019 | Zhu et al. |
| 2019/0201403 A1 | 7/2019 | Zhu et al. |
| 2019/0211021 A1 | 7/2019 | Zhang et al. |

(Continued)

FOREIGN PATENT DOCUMENTS

| CN | 107001378 | * 12/2015 | ........... C07D 487/04 |
| CN | 107001378 B | 8/2019 | |
| WO | 2017101777 A1 | 6/2017 | |

(Continued)

OTHER PUBLICATIONS

Wang, et al.; Three Cases of Ruxolitinib Rescue Therapy for Refractory/Relapsed Phagocytic Syndrome and Review of Literature; Chinese J. Hematology; vol. 40, No. 1; Jan. 31, 2019; pp. 73-75 (abstract translation).

China National Intellectual Property Administration; International Search Report of PCT/CN2021/079820; mailed Jun. 7, 2021; 10 pages.

Ahmed, A. et al., "Ruxolitinib in adult patients with secondary haemophagocytic lymphohistiocytosis: an open-label, single-centre, pilot trial," The Lancet Haematology, 6(12):e630-e637, Sep. 16, 2019.

European Patent Application No. 21767840.8, Extended European Search Report, Mar. 21, 2024, 7 pages.

Goldsmith, S. et al., "Resolution of secondary hemophagocytic lymphohistiocytosis after treatment with the JAK1/2 inhibitor ruxolitinib," Blood Advances, 3(23):4131-4135, Dec. 10, 2019.

(Continued)

*Primary Examiner* — Erich A Leeser
(74) *Attorney, Agent, or Firm* — Kilpatrick Townsend & Stockton LLP

(57) ABSTRACT

The present invention relates to use of a pyrrolopyrimidine compound for treating hemophagocytic syndrome, and particularly relates to use of a compound of formula (I), a stereoisomer thereof, or a pharmaceutically acceptable salt thereof, and a pharmaceutical composition thereof for treating hemophagocytic syndrome.

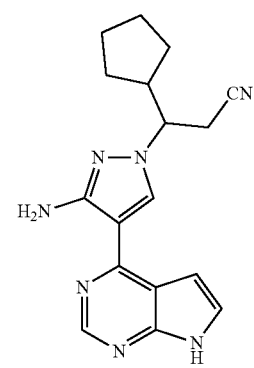

I

20 Claims, No Drawings

(56) References Cited

U.S. PATENT DOCUMENTS

2019/0330215 A1  10/2019  Zhou et al.

FOREIGN PATENT DOCUMENTS

| WO | 2017114461 A1 | 7/2017 |
| WO | 2017215627 A1 | 12/2017 |
| WO | 2017215628 A1 | 12/2017 |
| WO | 2017215630 A1 | 12/2017 |

OTHER PUBLICATIONS

Maschalidi, S. et al., "Therapeutic effect of JAK1/2 blockade on the manifestations of hemophagocytic lymphohistiocytosis in mice," Blood, 128(1):60-71, May 24, 2016.

Ramanan, K. et al., "Successful remission induction in refractory familial hemophagocytic lymphohistiocytosis with ruxolitinib as a bridge to hematopoietic stem cell transplantation," Pediatric Blood and Cancer, 67(3):e28071, Nov. 25, 2019.

* cited by examiner

USE OF PYRROLOPYRIMIDINE COMPOUND FOR TREATING HEMOPHAGOCYTIC SYNDROME

CROSS-REFERENCE TO RELATED APPLICATIONS

The present application is a § 371 National Phase Application of PCT/CN2021/079820, filed Mar. 9, 2021, which application claims priority and benefit to Chinese Patent Application No. 202010157375.4, filed with China National Intellectual Property Administration on Mar. 9, 2020, the disclosure of each of which is incorporated herein by reference in its entirety for all purposes herein.

TECHNICAL FIELD

The present application relates to the field of medicinal chemistry, and particularly, to use of a pyrrolopyrimidine compound in treating hemophagocytic syndrome.

BACKGROUND

Janus kinase (JAK) is a group of non-receptor tyrosine kinases (nRTKs). It exists in cells and transmits cytokine stimulation signals through the JAK-STAT pathway. The JAK-STAT pathway transmits extracellular chemical signals through the cell membrane to the gene promoter of DNA in the nucleus, which ultimately causes changes in DNA transcription and activity. The JAK-STAT pathway consists of three major components: 1) a receptor; 2) the JAK; and 3) a signal transducer and activator of transcription (STAT) protein. The receptor can be activated by interferons, interleukins, growth factors or other chemical messengers, leading to the autophosphorylation of JAK; the STAT protein binds to the phosphorylated receptor, such that the STAT protein is phosphorylated by JAK; then the phosphorylated STAT protein is separated from the receptor, dimerized and translocated into the nucleus to bind to the specific sites on DNA and alter the transcription (Scott, M. J., C. J. Godshall, et al., (2002) "Jaks, STATs, Cytokines, and Sepsis", Clin Diagn Lab Immunol 9(6):1153-9).

The JAK family plays a role in cell proliferation and functional cytokine-dependent regulation of immune responses. Currently, there are four known mammalian JAK family members: JAK1, JAK2, JAK3 and TYK2 (tyrosine kinase 2). The size of JAK proteins ranges from 120-140 kDa. A JAK protein contains 7 conserved JAK homology (JH) domains, one of which is a functional catalytic kinase domain, and another of which is a pseudokinase domain that effectively exerts a regulatory function and/or acts as a docking site for STAT proteins (Scott, Godshall, et al., 2002, supra).

Hemophagocytic syndrome, also known as hemophagocytic lymphohistiocytosis (HLH), is a group of clinical syndromes in which CD8$^+$ T lymphocytes and the mononuclear phagocyte system excessively proliferate and produce a large number of inflammatory factors that lead to fulminant inflammatory responses in multiple organ systems. They are clinically characterized by persistent fever, hepatosplenomegaly and bleeding. This disease is life-threatening. It occurs suddenly and progresses rapidly, and the mortality rate is extremely high. HLH is a disease in which the regulatory T cells and CD8$^+$ T cells are out of balance and the IL-2 network homeostasis is disrupted. In HLH, CD8$^+$ T cells are over-activated and succeed in competing with regulatory T cells for IL-2, thereby resulting in regulatory T cell hypofunction. HLH is characterized by acute clinical signs and symptoms of immune activation, including hepatomegaly, jaundice, lymphadenectasis, skin rash, epileptic seizure and focal neurological deficit, and shows elevated levels of a variety of inflammatory cytokines including interferon-γ (IFN-γ), tumor necrosis factor α (TNF-α), interleukin 6 (IL-6), interleukin 10 (IL-10) and macrophage colony-stimulating factor (M-CSF) in serum in the laboratory examination results.

SUMMARY

In one aspect, the present application provides a compound of formula I, or a stereoisomer or pharmaceutically acceptable salt thereof for use in treating hemophagocytic syndrome:

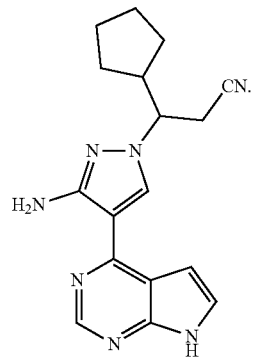

In another aspect, the present application provides a pharmaceutical composition for use in treating hemophagocytic syndrome, which comprises a compound of formula I, or a stereoisomer or pharmaceutically acceptable salt thereof.

In another aspect, the present application provides a method for treating hemophagocytic syndrome in a patient, which comprises administering to the patient an effective amount of a compound of formula I, or a stereoisomer or pharmaceutically acceptable salt thereof, or a pharmaceutical composition comprising the compound or stereoisomer or pharmaceutically acceptable salt.

In another aspect, the present application provides use of a compound of formula I, or a stereoisomer or pharmaceutically acceptable salt thereof, or a pharmaceutical composition comprising the compound or stereoisomer or pharmaceutically acceptable salt for preparing a medicament for treating hemophagocytic syndrome.

In another aspect, the present application provides use of a compound of formula I, or a stereoisomer or pharmaceutically acceptable salt thereof, or a pharmaceutical composition comprising the compound or stereoisomer or pharmaceutically acceptable salt in treating hemophagocytic syndrome.

DETAILED DESCRIPTION OF THE INVENTION

The present application provides a compound of formula I, or a stereoisomer or pharmaceutically acceptable salt thereof for use in treating hemophagocytic syndrome:

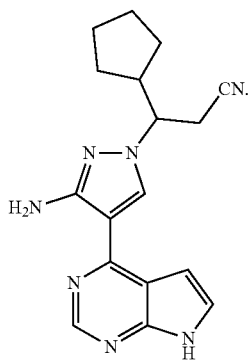

In another aspect, the present application provides a pharmaceutical composition for use in treating hemophagocytic syndrome, which comprises a compound of formula I, or a stereoisomer or pharmaceutically acceptable salt thereof.

In another aspect, the present application provides a method for treating hemophagocytic syndrome in a patient, which comprises administering to the patient an effective amount of a compound of formula I, or a stereoisomer or pharmaceutically acceptable salt thereof, or a pharmaceutical composition comprising a compound of formula I, or a stereoisomer or pharmaceutically acceptable salt thereof.

In another aspect, the present application provides use of a compound of formula I, or a stereoisomer or pharmaceutically acceptable salt thereof, or a pharmaceutical composition comprising a compound of formula I, or a stereoisomer or pharmaceutically acceptable salt thereof for preparing a medicament for treating hemophagocytic syndrome in a patient.

In another aspect, the present application provides use of a compound of formula I, or a stereoisomer or pharmaceutically acceptable salt thereof, or a pharmaceutical composition comprising a compound of formula I, or a stereoisomer or pharmaceutically acceptable salt thereof in treating hemophagocytic syndrome in a patient.

In some embodiments of the present application, the compound of formula I, or the stereoisomer or pharmaceutically acceptable salt thereof described herein is used as a single active agent.

In some embodiments of the present application, the compound of formula I, or the stereoisomer or pharmaceutically acceptable salt thereof described herein may be present in a pharmaceutical composition comprising a therapeutically effective amount of the compound of formula I, or the stereoisomer or pharmaceutically acceptable salt thereof.

The pharmaceutical composition of the present application can be prepared by combining the compound of the present application with a suitable pharmaceutically acceptable excipient, and can be formulated, for example, into a solid, semisolid, liquid, or gaseous formulation such as tablet, pill, capsule, powder, granule, ointment, emulsion, suspension, suppository, injection, inhalant, gel, microsphere, and aerosol. The pharmaceutical composition of the present application can be manufactured using methods well known in the art, such as conventional mixing, dissolving, granulating, dragee-making, levigating, emulsifying, and lyophilizing. Suitable excipients include, but are not limited to: binders, diluents, wetting agents, disintegrants, lubricants, glidants, sweeteners or flavoring agents, and the like.

In some embodiments of the present application, the pharmaceutical composition is a formulation suitable for oral administration, including tablets, capsules, powders, granules, dripping pills, pastes, pulvis, and the like, preferably tablets and capsules. The oral formulation can be prepared by a conventional method using a pharmaceutically acceptable carrier well known in the art. The pharmaceutically acceptable carrier includes diluents, binders, wetting agents, disintegrants, lubricants, and the like. The diluents include microcrystalline cellulose, mannitol, lactose, sucrose, starch, pregelatinized starch, dextrin, etc., or a mixture thereof; the binders include hydroxypropyl methylcellulose, carboxymethyl cellulose, carboxymethylcellulose sodium, ethyl cellulose, methyl cellulose, hydroxypropyl cellulose, low-substituted hydroxypropyl cellulose, gelatin, polyvinylpyrrolidone, starch, sucrose, glucose, gelatin, etc., or a mixture thereof; the wetting agents include magnesium stearate, talcum powder, polyethylene glycol, sodium dodecyl sulfate, silica gel micropowder, talcum powder, etc., or a mixture thereof; the disintegrants include sodium carboxymethyl starch, dry starch, microcrystalline cellulose, hydroxyethyl methylcellulose, carboxymethylcellulose sodium, carboxymethylcellulose calcium, croscarmellose sodium, low-substituted hydroxypropyl methylcellulose, crospovidone, etc., or a mixture thereof and the lubricants include magnesium stearate, colloidal silicon dioxide, talcum powder, polyethylene glycol, stearic acid, sodium stearyl fumarate, etc., or a mixture thereof. The pharmaceutical excipients also include coloring agents, sweeteners, coating agents, and the like.

Compound of Formula I

In some embodiments of the present application, the compound of formula I described herein is a compound of formula II

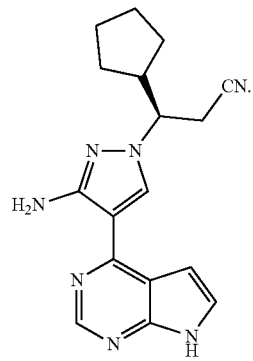 [SMILES: N#CC[C@H](C1CCCC1)n1cc(-c2ncnc3[nH]ccc23)c(N)n1]

The compound of formula I and the compound of formula II of the present application can be prepared according to the preparation methods in WO2016095805 or WO2017215627.

Hemophagocytic Syndrome

In some embodiments of the present application, the hemophagocytic syndrome includes primary hemophagocytic syndrome and secondary hemophagocytic syndrome. The primary hemophagocytic syndrome includes familial HLH, immunodeficiency syndrome-related HLH or EB virus (EBV)-driven HLH and other HLH caused by abnormalities of related genes. The secondary hemophagocytic syndrome includes infection-related HLH, malignancy-related HLH, macrophage activation syndrome (MAS) or other types of HLH.

In some embodiments of the present application, the familial HLH (also known as FHL) includes FHL-1, FHL-2, FHL-3, FHL-4 or FHL-5.

In some embodiments of the present application, the immunodeficiency syndrome-related HLH includes Griscelli syndrome 2 (GS-2), Chediak-Higashi syndrome 1 (CHS-1) or Hermansky-Pudlak syndrome II (HPS-II).

In some embodiments of the present application, the EBV-driven HLH includes X-linked lymphoproliferative (XLP) syndrome, which preferably includes XLP-1 and XLP-2 (i.e., X-linked inhibitor of apoptosis protein (XIAP) deficiency). The EBV-driven HLH further includes other EBV-driven HLH, which preferably includes IL-2-inducible T-cell kinase deficiency (ITK), CD27 deficiency and mutations of magnesium transporter gene (MAGT1).

In some embodiments of the present application, the infection in the infection-related HLH includes viral, bacterial, fungal and protozoal infections, and the like.

In some embodiments of the present application, the malignancy in the malignancy-related HLH includes hematological tumors or solid tumors. Preferably, the hematological tumors include lymphoma, acute leukemia, multiple myeloma, myelodysplastic syndrome, and the like. Preferably, the solid tumors include embryonic cell tumor, thymoma, gastric cancer, and the like.

In some embodiments of the present application, the macrophage activation syndrome (MAS) includes systemic or organ-specific autoimmune diseases.

In some embodiments of the present application, the other types of HLH include HLH induced by pregnancy, drugs, organ and hematopoietic stem cell transplantation and rare metabolic diseases.

In the present application, for the criteria for diagnosing hemophagocytic syndrome, reference may be made to the general principles in the field, such as "Chinese Experts' Consensus in Diagnosis and Therapy of HLH (2018)" or "HLH diagnosis criteria (2004)".

In the present application, the hemophagocytic syndrome includes hemophagocytic syndromes with mutations in genes. The mutated genes include, but are not limited to, JAK2/STAT, PRF1, UNC13D, STX11, STXBP2, Rab27a, LYST, SH2D1A, BIRC4, ITK, AP3β1, MAGT1 and CD27.

Administration Regimen

In some embodiments of the present application, the administration cycle for treating hemophagocytic syndrome in a patient is 2-6 weeks. In some embodiments of the present application, the administration cycle for treating hemophagocytic syndrome in a patient is 2 weeks, 3 weeks, 4 weeks, 5 weeks, 6 weeks, or a range formed by any of the aforementioned values. In some embodiments of the present application, the administration cycle for treating lymphoma in a patient is 4 weeks.

The amount of the compound, or the stereoisomer or pharmaceutically acceptable salt thereof disclosed herein can be determined on the basis of severity of the disease, response to therapy, any treatment-related toxicity, and the age and health of the patient. For example, it can be determined on the basis of the subject/patient's blood routine examination results, which includes platelet count, neutrophil count hemoglobin concentration, etc. In some embodiments, a daily dose of the compound, or the stereoisomer or pharmaceutically acceptable salt thereof disclosed herein administered is 1 mg to 100 mg. In some embodiments, a daily dose of the compound, or the stereoisomer or pharmaceutically acceptable salt thereof disclosed herein administered may be selected from the group consisting of 1 mg, 5 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg and 100 mg, or a range of any two of the foregoing values as endpoints or any value therein, for example, 1 mg to 90 mg, 5 mg to 80 mg, 10 mg to 70 mg, 15 mg to 60 mg, 20 mg to 50 mg, 20 mg to 40 mg, or 30 mg to 40 mg. In some specific embodiments, a daily dose of the compound, or the stereoisomer or pharmaceutically acceptable salt thereof disclosed herein administered may be selected from the group consisting of 1 mg to 50 mg, 5 mg to 50 mg, 5 mg to 45 mg, 5 mg to 40 mg, 10 mg to 35 mg, 10 mg to 30 mg, 20 mg to 40 mg, and 30 mg to 40 mg. In some specific embodiments, a daily dose of the compound, or the stereoisomer or pharmaceutically acceptable salt thereof disclosed herein administered may be selected from the group consisting of 1 mg, 2 mg, 5 mg, 8 mg, 10 mg, 12 mg, 15 mg, 18 mg, 20 mg, 22 mg, 25 mg, 28 mg, 30 mg, 32 mg, 35 mg, 38 mg, 40 mg, 42 mg, 45 mg, 48 mg and 50 mg, or a range of any two of the foregoing values as endpoints or any value therein, for example, 2 mg to 50 mg, 10 mg to 40 mg, 5 mg to 30 mg, 5 mg to 20 mg, 20 mg to 40 mg, or 30 mg to 40 mg.

The compound, or the stereoisomer or pharmaceutically acceptable salt thereof disclosed herein may be administered once or multiple times a day. In some embodiments, the compound, or the stereoisomer or pharmaceutically acceptable salt thereof disclosed herein is administered once or twice a day. The compound, or the stereoisomer or pharmaceutically acceptable salt thereof disclosed herein may also be administered in a single-dose. In one embodiment, the compound, or the stereoisomer or pharmaceutically acceptable salt thereof disclosed herein is administered in a single-dose once or twice a day. In one embodiment, the compound, or the stereoisomer or pharmaceutically acceptable salt thereof disclosed herein is administered in the form of a single-dose oral solid formulation once or twice a day. In one specific embodiment, the compound, or the stereoisomer or pharmaceutically acceptable salt thereof disclosed herein is administered in the form of a single-dose oral solid formulation twice a day.

The compound, or the stereoisomer or pharmaceutically acceptable salt thereof disclosed herein may also be administered in a multiple-dose. In one embodiment, the compound, or the stereoisomer or pharmaceutically acceptable salt thereof disclosed herein is administered in a multiple-dose once or twice a day. In one embodiment, the compound, or the stereoisomer or pharmaceutically acceptable salt thereof disclosed herein is administered in the form of a multiple-dose oral solid formulation once or twice a day. In one specific embodiment, the compound, or the stereoisomer or pharmaceutically acceptable salt thereof disclosed herein is administered in the form of a multiple-dose oral solid formulation twice a day.

In some embodiments of the present application, the compound of formula I, or the stereoisomer or pharmaceutically acceptable salt thereof is provided in the form of a pharmaceutical composition, preferably a single-dose pharmaceutical composition. In some embodiments, the pharmaceutical composition comprises 1 mg to 50 mg of the compound, or the stereoisomer or pharmaceutically acceptable salt thereof disclosed herein. In some embodiments, the pharmaceutical composition comprises 1 mg, 2 mg, 5 mg, 8 mg, 10 mg, 12 mg, 15 mg, 18 mg, 20 mg, 22 mg, 25 mg, 28 mg, 30 mg, 32 mg, 35 mg, 38 mg, 40 mg, 42 mg, 45 mg, 48 mg or 50 mg, or a range of any two of the foregoing values as endpoints or any value therein of the compound, or the stereoisomer or pharmaceutically acceptable salt thereof disclosed herein, for example, 2 mg to 50 mg, 10 mg to 40 mg, 5 mg to 30 mg, 5 mg to 20 mg, 20 mg to 40 mg, or 30 mg to 40 mg.

In some embodiments of the present application, the pharmaceutical composition comprising the compound of formula I, or the stereoisomer or pharmaceutically acceptable salt thereof is in a daily dose. In some embodiments of the present application, the pharmaceutical composition comprising the compound of formula I, or the stereoisomer or pharmaceutically acceptable salt thereof is in twice-daily doses. In some embodiments of the present application, the twice-daily doses are the same.

In some embodiments of the present application, the pharmaceutical composition comprising the compound of formula I, or the stereoisomer or pharmaceutically acceptable salt thereof is in twice-daily doses, with each dose being a single-dose or a multiple-dose.

In some embodiments of the present application, the pharmaceutical composition comprising the compound of formula I, or the stereoisomer or pharmaceutically acceptable salt thereof is in twice-daily doses, with each dose being a multiple-dose consisting of single-doses of 5 mg, 10 mg, 15 mg and/or 20 mg of the compound of formula I, or the stereoisomer or pharmaceutically acceptable salt thereof. In some embodiments of the present application, the pharmaceutical composition consists of single-doses of 5 mg of the compound of formula I, or the stereoisomer or pharmaceutically acceptable salt thereof.

In some embodiments of the present application, the pharmaceutical composition comprising the compound of formula I, or the stereoisomer or pharmaceutically acceptable salt thereof is in twice-daily doses, with each dose being a single-dose of 5 mg, 10 mg, 15 mg and/or 20 mg of the compound of formula I, or the stereoisomer or pharmaceutically acceptable salt thereof. In some embodiments of the present application, the single-dose is 20 mg of the compound of formula I, or the stereoisomer or pharmaceutically acceptable salt thereof.

In some embodiments of the present application, the pharmaceutical composition of a compound of formula I, or a stereoisomer or pharmaceutically acceptable salt thereof is packaged in a kit, which also contains instructions for use of a compound of formula I, or a stereoisomer or pharmaceutically acceptable salt thereof in treating hemophagocytic syndrome.

In some embodiments of the present application, in the method or use for treating hemophagocytic syndrome, the pharmaceutical composition comprising the compound of formula I, or the stereoisomer or pharmaceutically acceptable salt thereof is in a daily dose and is administered as follows: the pharmaceutical composition comprising the compound of formula I, or the stereoisomer or pharmaceutically acceptable salt thereof is administered once or twice a day; in some embodiments of the present application, the pharmaceutical composition comprising the compound of formula I, or the stereoisomer or pharmaceutically acceptable salt thereof is administered twice a day in the same dose; in some embodiments of the present application, the pharmaceutical composition comprising the compound of formula I, or the stereoisomer or pharmaceutically acceptable salt thereof is administered twice a day in the same dose at an interval of 12 h.

In some embodiments of the present application, 28 days constitute one treatment cycle, in which the pharmaceutical composition comprising the compound of formula I, or the stereoisomer or pharmaceutically acceptable salt thereof is administered consecutively from day 1 to day 28.

In some embodiments of the present application, 28 days constitute one treatment cycle, in which the pharmaceutical composition comprising the compound of formula I, or the stereoisomer or pharmaceutically acceptable salt thereof is administered twice a day consecutively from day 1 to day 28.

In some embodiments of the present application, 28 days constitute one treatment cycle, in which a total dose of 140-840 mg of the pharmaceutical composition comprising the compound of formula I, or the stereoisomer or pharmaceutically acceptable salt thereof (calculated based on the active ingredient, the compound of formula (I)) is administered. In some embodiments of the present application, the total dose of the pharmaceutical composition comprising the compound of formula I, or the stereoisomer or pharmaceutically acceptable salt thereof is selected from the group consisting of 140 mg, 280 mg, 420 mg, 560 mg, 700 mg and 840 mg or from a range formed by any two of the aforementioned values (calculated based on the active ingredient, the compound of formula (I)). In some embodiments of the present application, the total dose of the pharmaceutical composition comprising the compound of formula I, or the stereoisomer or pharmaceutically acceptable salt thereof is preferably 560-840 mg (calculated based on the active ingredient, the compound of formula (I)).

In some embodiments of the present application, the treatment cycle is repeated as long as the disease is managed and the administration regimen is clinically tolerable.

The compound, or the stereoisomer or pharmaceutically acceptable salt thereof disclosed herein can be administered by various routes, including but not limited to, oral, parenteral, intraperitoneal, intravenous, intra-arterial, transdermal, sublingual, intramuscular, rectal, transbuccal, intranasal, inhalational, vaginal, intraocular, topical, subcutaneous, intra-adipose, intra-articular and intrathecal administrations. In one specific embodiment, the route is oral administration.

In some embodiments of the present application, the pharmaceutical composition comprising the compound of formula I, or the stereoisomer or pharmaceutically acceptable salt thereof may be formulated in a form suitable for oral administration to a human, for example, including but not limited to tablet, pill, capsule, powder and granule.

In some embodiments of the present application, the pharmaceutical composition comprising the compound of formula I, or the stereoisomer or pharmaceutically acceptable salt thereof is formulated as oral tablets.

In some embodiments of the present application, a single-dose of the oral tablet of the compound of formula I, or the stereoisomer or pharmaceutically acceptable salt thereof is 5 mg or 20 mg.

Technical Effects

A compound of formula I, or a stereoisomer or pharmaceutically acceptable salt thereof, or the pharmaceutical composition thereof disclosed herein has favorable therapeutic effects, including but not limited to, better disease control rate, longer survival time (e.g., median survival time, progression-free survival time or overall survival time) and longer duration of response (DOR) to the treatment of the disease. A compound of formula I, or a stereoisomer or pharmaceutically acceptable salt thereof, or the pharmaceutical composition thereof disclosed herein also has favorable safety in addition to favorable therapeutic effects, including but not limited to a lower incidence of adverse events.

Definitions

Unless otherwise stated, the following terms used herein shall have the following meanings. A certain term, unless otherwise specifically defined, should not be considered uncertain or unclear, but construed according to its common meaning in the field. When referring to a trade name, it is intended to refer to its corresponding commercial product or its active ingredient.

As used herein, unless otherwise stated, the terms "comprise", "comprises" and "comprising" or equivalents thereof are open-ended statements and mean that elements, components and steps that are not specified may be included in addition to those listed.

All patents, patent applications and other identified publications are expressly incorporated herein by reference for the purpose of description and disclosure. Any reference to these publications herein is not to be construed as an admission that the publications form part of the commonly recognized knowledge in the art.

The term "pharmaceutically acceptable" is used herein for those compounds, materials, compositions, and/or dosage forms which are, within the scope of sound medical judgment, suitable for use in contact with the tissues of human beings and animals without excessive toxicity, irritation, allergic response, or other problems or complications, and commensurate with a reasonable benefit/risk ratio.

The term "pharmaceutically acceptable salt" includes salts formed from basic radicals and free acids and salts formed from acidic radicals and free bases. The pharmaceutically acceptable salt described herein is selected from the group consisting of maleate salt, hydrochloride salt, hydrobromide salt, sulfate salt, phosphate salt, nitrate salt, acetate salt, lactate salt, malonate salt, succinate salt, fumarate salt, malate salt, mandelate salt, tartrate salt, citrate salt, ascorbate salt, palmitate salt, benzoate salt, phenylacetate salt, cinnamate salt, salicylate salt, methanesulfonate salt, benzenesulfonate salt and methylbenzenesulfonate salt.

As used herein, the amount of a compound of formula I, e.g., the amount administered, the dose or the amount in the pharmaceutical composition, is calculated based on its free base form.

As used herein, if the compound in the pharmaceutical combination has, for example, at least one basic site, an acid addition salt may be formed. If needed, it may further form an acid addition salt with additional existing basic sites. A compound with at least one acidic group (for example, —COOH) can further form a salt with a base. A compound, for example, comprising both carboxyl and amino, can further form an inner salt.

The compound disclosed herein can be asymmetrical, for example, has one or more stereoisomers. Unless otherwise stated, all stereoisomers are included, for example, enantiomers and diastereoisomers. The compound with asymmetric carbon atoms disclosed herein can be separated in an optically pure form or in a racemic form. The optically pure form can be separated from a racemic mixture or can be synthesized using a chiral raw material or a chiral reagent.

The term "patient" is a mammal, such as a human, dog, cow, horse, pig, sheep, goat, cat, mouse, rabbit, rat or transgenic non-human animal. In some embodiments, the patient is a human.

The term "pharmaceutical composition" refers to a mixture consisting of one or more of the compounds or the pharmaceutically acceptable salts thereof, or the pharmaceutical combinations thereof disclosed herein and a pharmaceutically acceptable excipient. The pharmaceutical composition is intended to facilitate the administration of the compound or the pharmaceutical combination thereof disclosed herein to a subject.

The term "treatment" generally refers to obtaining desired pharmacological and/or physiological effects, including partially or completely stabilizing or curing a disease and/or an effect the disease has. As used herein, "treatment" encompasses any treatment of a disease in a patient, including (a) inhibiting a symptom of the disease, i.e., blocking the progression of the disease; or (b) alleviating a symptom of the disease, i.e., causing remission of the disease or the symptom.

The term "effective amount" refers to an amount of the compound disclosed herein for (i) treating a specific disease, condition or disorder, or (ii) alleviating, ameliorating or eliminating one or more symptoms of a specific disease, condition or disorder. The amount of the compound of the present application composing the "therapeutically effective amount" varies dependently on the compound, the disease state and its severity, the mode of administration, and the age of the mammal to be treated, but can be determined routinely by those skilled in the art in accordance with their knowledge and the present disclosure.

The term "single-dose" refers to the smallest unit of packaging containing a certain quantity of pharmaceutical product; for example, in a box of seven capsules, each capsule is a single-dose; or a vial of injection is a single-dose.

The term "multiple-dose" consists of a plurality of single-doses.

The terms "administer", "administration" and "administering" refer to physically introducing the composition comprising a therapeutic agent to an individual using any of a variety of methods and delivery systems known to those skilled in the art. In certain embodiments, the administration is oral administration.

The term "daily dose" refers to a dose administered to a patient per day.

The terms "day", "daily", etc., when referred to in an administration regimen, refer to the time within a calendar day that starts at midnight and ends at the next midnight.

EXAMPLES

The present invention will be illustrated in more detail through specific examples. The following examples are provided for illustrative purposes only, and are not intended to limit the present invention in any way.

Preparation Example 1: Preparation of 5 mg and 20 mg Solid Pharmaceutical Composition Tablets The formula for 5 mg and 20 mg solid pharmaceutical composition tablets is shown in Table 1.

TABLE 1

| Formula for 5 mg and 20 mg tablets | | |
|---|---|---|
| Ingredients | Formulation (mg) | |
| Compound of formula II | 5 | 20 |
| Mannitol | 35.275 | 141.1 |
| Microcrystalline cellulose | 70 | 280 |
| Croscarmellose sodium | 3.6 | 14.4 |
| Sodium dodecyl sulfate | 0.125 | 0.5 |
| Hydroxypropyl cellulose | 4.8 | 19.2 |
| Magnesium stearate | 1.2 | 4.8 |
| Purified water | Proper amount | Proper amount |

Protocols
1) Mannitol, microcrystalline cellulose and croscarmellose sodium were mixed to prepare a mixture A for further use;

Preparation of drug substance suspension: Hydroxypropyl cellulose was dissolved in purified water to prepare a 4% (w/w) hydroxypropyl cellulose solution; sodium dodecyl sulfate was dissolved; the compound of formula II was added and dispersed by stirring to prepare a drug substance suspension;

2) Fluidized bed granulation and drying: the drug substance suspension was applied to the mixture A by spraying for fluidized granulation; Granulation parameters: inlet air temperature: 55-80° C., spraying pressure: 600-1000 mbar, material temperature: 25-35° C. Drying started after the spraying, and ended when the material temperature was higher than 45° C. The materials were sized in a mill through a sieve with a mesh size of Φ 0.6-1.2 mm, and dried granules were obtained;

3) The dried granules and magnesium stearate were sequentially fed into a hopper mixer and well mixed to give a solid pharmaceutical composition for tableting.

Example 1. Clinical Protocol for Hemophagocytic Syndrome 1.1. Administration Regimen Method of administration: orally administered once before breakfast in the morning and once after 12 h, with 28 consecutive days of administration as one treatment cycle.

Drug: the compound of formula I in 5 mg or 20 mg tablets, the compound of formula I being shown as its stereoisomer, a compound of formula II

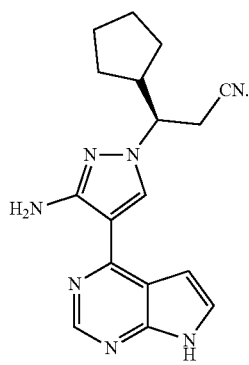 [SMILES: N#CC[C@H](C1CCCC1)n1cc(-c2ncnc3[nH]ccc23)c(N)n1]

1.2. Inclusion Criteria
1) Age ≥18 years; ECOG scoring: 0-3; an expected survival of more than 3 months;
2) A patient unambiguously diagnosed as having a first occurrence or first recurrence of HLH according to the HLH-2004 criteria;
3) Other medication for HLH, if any, has been interrupted for 2 weeks or more; it has been 4 weeks or more since major surgery, if any;
4) Laboratory tests should meet the following: blood routine examination: hemoglobin (Hb)≥60 g/L; absolute neutrophil count (ANC)≥0.5×10$^9$/L; platelet (PLT) ≥30×10$^9$/L; liver function: serum total bilirubin (TBIL) <171 μmol/L; renal function: serum creatinine (Cr) ≤1.5×ULN; blood coagulation function: activated partial thromboplastin time (APTT) and international normalized ratio (INR)≤1.5×ULN;
5) Female patients should agree to take contraceptive measures (such as intrauterine devices [IUD], contraceptives or condoms) during the study and for at least 6 months after the study; serum pregnancy test results should be negative within 7 days before the study, and the patients must not be breastfeeding; male subjects should agree to take contraceptive measures during the study and for at least 6 months after the study;
6) Voluntary participation, written informed consent and good compliance.

1.3. Evaluation Method

The therapeutic effect was evaluated by referring to the criteria of "2018 HLH Chinese Expert Consensus". During induction treatment, it was recommended to evaluate the therapeutic effect every 2 weeks.

The primary indexes for therapeutic effect evaluation included sCD25, ferritin, blood count, triacylglycerol, hemophagia, and level of consciousness (for those with CNS-HLH).

a) Complete response: all the above indexes return to the normal ranges.
b) Partial response: 25% improvement or more in 2 or more symptoms/laboratory indexes, some indexes should meet the following criteria: (1) sCD25 level decreases by a factor of 3/2 or more; (2) ferritin and triacylglycerol levels decreases by 25% or more; (3) without blood transfusion: for those whose neutrophil counts <0.5×10$^9$/L, the neutrophil counts should increase by 100% and >0.5×10$^9$/L; for those whose neutrophil counts are 0.5-2.0×10$^9$/L, the neutrophil counts should increase by 100% and return to normal levels; (4) for those whose ALT>400 U/L, the ALT should decrease by 50% or more.

1.4. Therapeutic Effects

Case 1

A 45-year-old female patient diagnosed with hemophagocytic syndrome was given 20 mg/dose of tablets of the compound of formula II according to the administration regimen described in 1.1. The blood was tested regularly for the plasma concentration. The indexes such as blood routine examination results, biochemical profile and blood coagulation were dynamically monitored, and the patient's condition and vital signs were continuously dynamically monitored closely. In case 1, after one administration cycle, the disease remained stable, and the treatment was tolerable by the patient.

Case 2

A 44-year-old female patient diagnosed with hemophagocytic syndrome was given 15 mg/dose of tablets of the compound of formula II according to the administration regimen described in 1.1. The blood was tested regularly for the plasma concentration. The indexes such as blood routine examination results, biochemical profile and blood coagulation were dynamically monitored, and the patient's condition and vital signs were continuously dynamically monitored closely.

In case 2, after one administration cycle, the disease remained stable, the sCD25 level decreased by a factor of 3/2 or more, the ferritin level decreased by 25% or more, a partial response was achieved to the treatment of the disease, and the treatment was tolerable by the patient.

The invention claimed is:
1. A method for treating hemophagocytic syndrome in a patient comprising administering to the patient an effective amount of a compound of formula I, or a stereoisomer or pharmaceutically acceptable salt thereof, or a pharmaceutical composition comprising the compound of formula I, or the stereoisomer or pharmaceutically acceptable salt thereof,

I

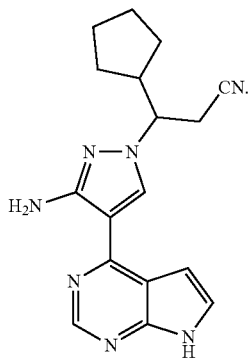

2. The method according to claim 1, wherein the hemophagocytic syndrome is selected from the group consisting of primary hemophagocytic syndrome and secondary hemophagocytic syndrome.

3. The method according to claim 2, wherein the primary hemophagocytic syndrome is selected from the group consisting of familial HLH, immunodeficiency syndrome-related HLH, EB virus-driven HLH and HLH caused by abnormalities of a gene selected from the group consisting of JAK2/STAT, PRF1, UNC13D, STX11, STXBP2, Rab27a, LYST, SH2D1A, BIRC4, ITK, AP3β1, MAGT1 and CD27.

4. The method according to claim 2, wherein the secondary hemophagocytic syndrome is selected from the group consisting of infection-related HLH, malignancy-related HLH, macrophage activation syndrome and HLH induced by pregnancy, a drug, organ and hematopoietic stem cell transplantation or a rare metabolic disease.

5. The method according to claim 1, wherein the hemophagocytic syndrome is a hemophagocytic syndrome with a mutated gene selected from the group consisting of JAK2/STAT, PRF1, UNC13D, STX11, STXBP2, Rab27a, LYST, SH2D1A, BIRC4, ITK, AP3β1, MAGT1 and CD27.

6. The method according to claim 1, wherein the compound of formula I is:

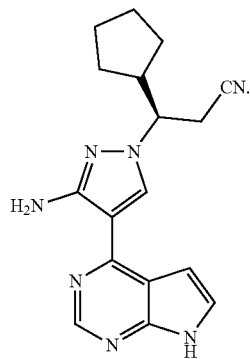 [SMILES: N#CC[C@H](C1CCCC1)n1cc(-c2ncnc3[nH]ccc23)c(N)n1]

7. The method according to claim 1, wherein the method comprises administering to the patient a daily dose of 1 mg to 100 mg of the compound of formula I, or the stereoisomer or pharmaceutically acceptable salt thereof, or the pharmaceutical composition comprising the compound of formula I, or the stereoisomer or pharmaceutically acceptable salt thereof.

8. The method according to claim 7, wherein the daily dose 1 mg, 5 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg, or a range defined by any two of the foregoing values as endpoints.

9. The method according to claim 7, wherein the daily dose is 1 mg to 90 mg, 5 mg to 80 mg, 10 mg to 70 mg, 15 mg to 60 mg, 20 mg to 50 mg, or 30 mg to 40 mg.

10. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof once or multiple times a day.

11. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof once or twice a day.

12. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof in a single-dose formulation once or twice a day.

13. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof in a single-dose oral solid formulation once or twice a day.

14. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof in a multiple-dose formulation once or twice a day.

15. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof in a multiple-dose oral solid formulation once or twice a day.

16. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof in twice-daily doses, with each dose being a multiple-dose formulation consisting of single doses of 5 mg, 10 mg, 15 mg and/or 20 mg of the compound of formula I, or the stereoisomer or pharmaceutically acceptable salt thereof.

17. The method according to claim 1, wherein the method comprises administering to the patient the compound of formula I, or the stereoisomer or pharmaceutically acceptable salt thereof, or the pharmaceutical composition comprising the compound of formula I, or the stereoisomer or pharmaceutically acceptable salt thereof in twice-daily dose, with each dose being a single dose of 5 mg, 10 mg, 15 mg and/or 20 mg of the compound of formula I, or the stereoisomer or pharmaceutically acceptable salt thereof.

18. The method according to claim 1, wherein the method comprises treating the patient over one treatment cycle of 28 days, and administering to the patient the pharmaceutical composition comprising the compound of formula I, or the stereoisomer or pharmaceutically acceptable salt thereof consecutively from day 1 to day 28.

19. The method according to claim 1, wherein the method comprises treating the patient over one treatment cycle of 28 days, and administering to the patient a total dose of 140-840 mg of the pharmaceutical composition comprising the compound of formula I, or the stereoisomer or pharmaceutically acceptable salt thereof.

20. The method according to claim 19, wherein the total dose is selected from the group consisting of 140 mg, 280 mg, 420 mg, 560 mg, 700 mg and 840 mg or a range defined by any two of the aforementioned values.

* * * * *